United States Patent [19]

McKay

[11] 4,331,563

[45] May 25, 1982

[54] PRODUCING INCREASED YIELD OF HYDROGEN BY CRACKING PETROLEUM WITH POTASSIUM-CONTAINING CATALYST

[75] Inventor: Dwight L. McKay, Bartlesville, Okla.

[73] Assignee: Phillips Petroleum Company, Bartlesville, Okla.

[21] Appl. No.: 934,925

[22] Filed: Aug. 18, 1978

[51] Int. Cl.³ .............................................. B01J 29/06
[52] U.S. Cl. .................................. 252/455 Z; 208/120
[58] Field of Search .......................... 252/455 Z, 425; 208/120

[56] References Cited

U.S. PATENT DOCUMENTS 3,816,298  6/1974  Aldridge ........................ 252/425 X
4,098,677  7/1978  Waghorne ...................... 208/164 X

*Primary Examiner*—Carl F. Dees

[57] ABSTRACT

A petroleum cracking catalyst having thereon metals usually found in petroleum, e.g., iron, nickel and vanadium, is modified by addition of potassium to increase significantly the rate of hydrogen production when employing the thus-modified catalyst for cracking of petroleum.

4 Claims, No Drawings

PRODUCING INCREASED YIELD OF HYDROGEN BY CRACKING PETROLEUM WITH POTASSIUM-CONTAINING CATALYST

This invention relates to the catalytic cracking of petroleum. In one of its aspects the invention relates to the production of hydrogen by cracking petroleum in the presence of a catalyst. In a further aspect of the invention it relates to the preparation of a modified petroleum cracking catalyst suited to increasing production of hydrogen. In still another of its aspects the invention relates to the production of petroleum-cracking products, e.g., gasoline and hydrogen.

In one of its concepts the invention provides a process for the modification of a cracking catalyst which contains metals usually found in petroleum, e.g., iron, nickel and vanadium, as in a catalyst which has been used for the catalytic cracking of petroleum, by adding thereto potassium or an equivalent alkali metal compound. In another of its concepts the invention provides a process for the catalytic cracking of a petroleum oil to produce cracking products including a gasoline and hydrogen, the hydrogen being obtained in yield which is substantially greater than that obtained ordinarily with the usual cracking catalyst, by modifying the catalyst by the addition of an alkali metal, e.g., potassium, thereto.

In certain refinery operations, e.g., hydrotreating operations, considerable quantities of hydrogen are consumed. One way in which to produce hydrogen is to do so employing a cracking catalyst as in the production of gasoline. It is desirable to obtain increased yields of hydrogen when cracking to produce gasoline without significant loss of gasoline yield and without significant increase in production of coke, which must be expensively removed from the catalyst during regeneration. Energy considerations are involved in any such process as is well known. For example, the cost of compressing air for regeneration of the catalyst by burning coke therefrom is significant. Further, in existing plants, there is limited capacity for regeneration of catalyst. Accordingly, it is helpful to have a catalyst and process for production of hydrogen in increased quantities without materially increasing coke production.

An object of the invention is to produce hydrogen from petroleum. Another object of the invention is to modify a petroleum cracking catalyst in a manner such that increased quantities of hydrogen can be obtained when employing the modified catalyst to crack a petroleum oil for hydrocarbon. A further object of the invention is to produce increased quantities of hydrogen from a catalytic cracking petroleum process without significantly losing gasoline yield or increasing significantly coke production.

Other aspects, concepts, objects and the several advantages of the invention are apparent from a study of this disclosure and the claims.

According to the present invention there is added to a catalyst used in the cracking of a petroleum oil or hydrocarbon an alkali metal, e.g., potassium, the catalyst also containing metals commonly found in petroleum, e.g., iron, nickel and vanadium. The catalyst, prepared according to the invention, is employed, also according to the invention, to crack a petroleum oil or hydrocarbon.

Such cracking catalyst materials can be any of those cracking catalysts conventionally employed in the catalytic cracking of hydrocarbons boiling above 400° F. (204° C.) for the production of gasoline, motor fuel, blending components and light distillates. These conventional cracking catalysts generally contain silica or silica-alumina. Such materials are frequently associated with zeolitic materials. These zeolitic materials can be naturally occurring, or they can be produced by conventional ion exchange methods such as to provide metallic ions which improve the activity of the catalyst. Zeolite-modified silica-alumina catalysts are particularly applicable in this invention. When used to crack feedstock that contains the metals commonly found in petroleum, i.e., iron, nickel and vanadium, these metals tend to accumulate on the catalyst. For the purpose of this invention the cracking catalyst should contain a minimum of 0.02 wt. percent of metal that has been deposited on it during use.

Generally, the deposited metal will be a mixture containing all three elements listed, but it may be predominantly or even exclusively any one of the three. The maximum concentration of contaminating metals will be limited by the concentration at which the catalyst becomes insufficiently active for cracking. Metal content, referred to here, does not include metals that were incorporated into the catalyst during its manufacture. The latter are relatively unimportant because they are much less accessible to the hydrocarbon during cracking than are the metals that have been deposited on the active surface of the catalyst.

In view of results obtained with potassium experimentally, it appears that lithium, sodium, rubidium and cesium, the other members of Group Ia of the Periodic Table, will also be effective to enhance hydrogen production with metal-contaminated cracking catalysts.

The quantity of potassium required to treat the catalyst is in the range of from about 0.01 to about 0.5 wt. percent, expressed as the element. This is equivalent to 0.0026 to 0.128 milli-equivalents per gram of catalyst. The preferred concentration of added potassium is from about 0.01 to about 0.1 wt. percent, equivalent to 0.0026 to 0.026 milli-equivalents per gram of catalyst. The same atomic concentration of the other alkali metals should be used when they are substituted for potassium. As above noted, these concentrations are in addition to the alkali metals that were incorporated into the catalyst during its manufacture.

Potassium, or another alkali metal compound, can be added to the metal-contaminated catalyst in a variety of ways with equally satisfactory results. These include:

(1) Addition at regeneration conditions. A dilute solution, e.g., in water, of a potassium compound is sprayed into the regenerator of a catalytic cracker, to treat uniformly the contained catalyst. (2) Addition in oil feed. A oil-soluble compound, e.g., potassium oleate, is dissolved in the petroleum feedstock to the catalytic cracker.

(3) Solution impregnation. The catalyst can be wetted with a solution-aqueous of organic- of an appropriate potassium compound. After removal of the solvent by drying, the catalyst is ready for use.

As indicated, either oil-soluble or water-soluble compounds of potassium (or other alkali metals) are suitable to treat the cracking catalyst. Preferred compounds include the carbonate, bicarbonate, or hydroxide, and salts of carboxylic acids such as the acetate, butyrate, or octadecanoate. Less preferable are compounds containing halogens. Under reaction conditions they tend to release the halogen, causing corrosion in the catalytic cracker.

Addition of potassium to a metal-contaminated catalyst has been shown to enhance significantly its rate of hydrogen production. It is believed that similar results would be obtained if the addition of potassium was concurrent with the accumulation of iron, nickel and vanadium, and also if the potassium were added to the surface prior to the exposure of the catalyst to metal-contaminated petroleum.

The cracking catalysts treated as described can be used similarly to the use of untreated catalyst. Treated catalysts have been shown to withstand successfully regeneration at 1300° F. (740° C.), which is hotter than usually obtained in the regeneration.

Although the addition of a small amount of potassium (or another alkali metal) to metal-contaminated cracking catalyst is effective to increase the production of hydrogen, the quantity of added alkali must be carefully monitored. When the acid sites on the cracking catalyst have been neutralized, very little activity remains. A sufficiency of such sites should be preserved.

Hydrogen produced with catalyst made by this invention will of necessity be quite impure. Residue gas obtained as effluent from a plant treating the product of a catalytic cracker operating on metals-contaminated cracking catalyst has composition typified in Table I.

The acid gases (hydrogen sulfide and carbon dioxide) are readily removed by scrubbing, and the remainder can be used without further treatment. Alternatively the hydrogen-containing stream can be subjected to cryogenic treatment from which essentially pure hydrogen is produced.

TABLE I

| Residue Gas Composition | |
|---|---|
| $CO + N_2$ | 6.2 mole % |
| $CO_2$ | 2.9 |
| $H_2S$ | 5.3 |
| $H_2$ | 30.1 |
| $CH_4$ | 24.7 |
| $C_2$'s | 25.0 |
| $C_3$'s | 4.0 |
| $C_4$'s | 1.8 |

EXAMPLES

Identical tests were made on five catalysts to illustrate the invention.

CATALYST 1

This was equilibrium zeolite catalyst taken from a cracking unit that processed residuum. It contained 80% F-1000 (manufactured by Filtrol Corp.). Its surface area was 74.3 $m^2 gm^{-1}$ and, by analysis, contained 0.38 wt. percent Ni, 0.60 wt. percent V, and 0.90 wt. percent Fe.

CATALYST 4

To 40 gm of Catalyst 1 being fluidized in a quartz reactor with 0.6 CFH air while being heated at about 1300° F. (704° C.) there was added, during 220 minutes, a solution containing 0.0394 gm potassium hydroxide dissolved in 100 ml water. Weight of recovered catalyst was 34.9 gm. This represents an addition of 0.073 wt. percent K to the catalyst.

CATALYST 3

To 32.8 gm of Catalyst 1 being fluidized in a quartz reactor with nitrogen while being heated at 950° F. (510° C.) there was added 0.0218 gm potassium as a solution of potassium oleate dissolved in gas oil. This represents an addition of 0.066 wt. percent K to the catalyst.

CATALYST 5

A 150 gm portion of Catalyst 1 was wetted with 150 cc of water; to the resulting paste was added 0.0901 gm potassium (as potassium hydroxide) dissolved in 80 additional cc of water. After thorough mixing it was completely dried on a hot plate at above 400° F. (200° C.). This treatment represented the addition of 0.086 wt. percent potassium to the catalyst.

CATALYST 2

To 40.11 gm of Catalyst 1 there was added 58 cc of water. The resultant paste was permitted to stand at ambient conditions for several days, then dried on a hot plate in a manner similar to Catalyst 5. This catalyst received no additional potassium, but was treated with water only.

These catalysts were evaluated in a fluidized bed reactor system using standardized conditions of 1300° F. (704° C.) for regeneration and 950° F. (510° C.) for reaction with topped crude oil for 0.5 minutes. Inspection data for the topped crude are presented in Table II. The catalyst to oil ratio was varied as needed to obtain the required conversion. The gas and liquid products were analyzed by gas liquid chromatography and the reactor was weighed to determined coke. Most runs had better than 95 percent material balance. A few runs with lower material balance were discarded. The data points were smoothed by a least squares method. Results at 75 vol. % conversion are given in Table III.

TABLE II

| Topped Crude Inspection Data | | |
|---|---|---|
| API gravity @ 60° F. | 20.9 | |
| Distillation, ASTM D-1160 | | |
| 2% overhead | 670° F. | (354° C.) |
| 10 | 815 | 435 |
| 20 | 895 | 479 |
| 30 | 944 | 507 |
| 40 | 1001 | 538 |
| 50 | 1066 | 574 |
| Carbon residue, Ramsbottom | 5.6 wt. percent | |
| Carbon | 85.8 wt. percent | |
| Hydrogen | 11.8 wt. percent | |
| Nitrogen | 0.27 wt. percent | |
| Sulfur | 1.2 wt. percent | |
| Nickel | 5.24 ppm | |
| Vanadium | 5.29 ppm | |
| Iron | 29 ppm | |
| Pour point | 70° F. | |
| Viscosity, SUS @ 210° F. | 142 | |

TABLE III

Effect of Adding Potassium to Metal-Contaminated Cracking Catalyst

| | | | Yields | | |
|---|---|---|---|---|---|
| Catalyst | Wt. % K Added | Catalyst: Oil | Gasoline, vol % | Coke, wt. % of Feed | SCF $H_2$/bbl oil converted |
| 1 | None | 7.4 | 54.8 | 16.4 | 800 |
| 2 | None | 6.3 | 57.3 | 15.5 | 875 |
| 3 | 0.066 | 6.7 | 57.7 | 15.9 | 955 |
| 4 | 0.073 | 7.4 | 55.7 | 16.0 | 974 |
| 5 | 0.086 | 7.0 | 58.5 | 17.1 | 983 |

All tests in which the original catalyst was modified resulted in hydrogen yield that was significantly greater than from the original catalyst. However, the increase obtained with Catalysts 3, 4 and 5, to which potassium had been added, was at least twice as great as from Catalyst 2, and furthermore the change in the activity of Catalyst 2 was short-lived when compared to the change in Catalysts 3, 4 and 5. The difference in the yield of coke from the catalysts is considered to be insignificant. The yield of gasoline was appreciably increased with catalysts 2, 3 and 5 over that obtained with Catalyst 1.

Reasonable variation and modification are possible within the scope of the foregoing disclosure and the appended claims to the invention the essence of which is that a cracking catalyst containing metals commonly deposited thereon from petroleum cracked thereby is modified by addition of an alkali metal, e.g., potassium, in an amount sufficient to significantly increase the hydrogen production with said catalyst.

I claim:

1. A petroleum cracking catalyst suited for cracking a petroleum hydrocarbon or oil, said oil containing metals commonly found in petroleum, said catalyst being suitable for high gasoline production, under catalytic cracking conditions suited to produce high gasoline yields, modified with an amount of potassium sufficient to cause appreciable increase in hydrogen produced when said catalyst is employed for cracking of said hydrocarbon or oil but insufficient to cause any substantial loss in gasoline yield when cracking under said conditions, the potassium being added to the catalyst in the range of from about 0.01 to about 0.5 weight percent, calculated as the element.

2. A catalyst according to claim 1 wherein the potassium is present in an amount in the range of from about 0.01 to about 0.1 weight percent.

3. A petroleum cracking catalyst which has been used for cracking a feedstock, said feedstock containing metals commonly found in petroleum, said catalyst being suitable for high gasoline production, under catalytic conditions suited to produce high gasoline yields, said catalyst having been modified by addition of a minor amount of potassium thereto in the approximate range of from about 0.01 to about 0.5 weight percent, expressed as the metal, sufficient to increase yield of hydrogen otherwise obtained in said catalyst.

4. A catalyst according to claim 3 wherein the potassium is present in an amount in the range of from about 0.01 to about 0.1 weight percent.

* * * * *